United States Patent

Chavez, Jr. et al.

[11] Patent Number: 5,914,668
[45] Date of Patent: *Jun. 22, 1999

[54] WIRELESS TERMINAL CONTROLLED MOBILITY OPERATIONAL PARAMETERS

[75] Inventors: David L. Chavez, Jr., Thornton; Ted M. Fidder, Broomfield; Larry J. Hardouin, Westminster, all of Colo.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/697,841

[22] Filed: Aug. 30, 1996

[51] Int. Cl.⁶ .................................................. H04Q 7/00
[52] U.S. Cl. ................ 340/825.44; 455/509; 455/403; 455/437; 455/419; 455/436; 455/422; 455/414; 455/504; 455/566; 455/553; 379/204
[58] Field of Search .................................... 455/403, 437, 455/504, 555, 436, 414, 418, 550, 570, 566, 575, 553, 435, 419, 422, 509; 340/825.44; 379/204

[56] References Cited

U.S. PATENT DOCUMENTS

| | | | |
|---|---|---|---|
| 4,811,380 | 3/1989 | Spear | 455/437 |
| 5,222,248 | 6/1993 | McDonald et al. | 455/509 |
| 5,265,150 | 11/1993 | Helmkamp et al. | 379/58 |
| 5,396,541 | 3/1995 | Farwell et al. | 379/60 |
| 5,450,615 | 9/1995 | Fortune et al. | 455/67.6 |
| 5,479,476 | 12/1995 | Finke-Anlauff | 379/204 |
| 5,539,803 | 7/1996 | Bhat et al. | 455/423 |
| 5,579,535 | 11/1996 | Orlen et al. | 340/995 |

*Primary Examiner*—Brian Zimmerman
*Assistant Examiner*—Yves Dalencourt
*Attorney, Agent, or Firm*—John C. Moran

[57] ABSTRACT

Allowing a user of a wireless terminal to control the mobility operational parameters when desired by the user. The user enters parameter selection information into the wireless terminal; and the wireless terminal converts this parameter selection information into operational parameters and activates these operational parameters. The operational parameters can include a noise threshold level for determining when to mute audio information being communicated between the wireless terminal and a base station. Another operational parameter is the hand-off signal threshold level below which the wireless terminal seeks a new base station upon which to register. The parameter selection information can be in the form of icons which the user selects, or the user may enter precise numerical data. The user of the wireless terminal is given the capability of specifying the base station to which the wireless terminal will register. In addition, for testing purposes the wireless terminal can be programmed to display the signal strength of the base station on which the wireless terminal is registered.

20 Claims, 12 Drawing Sheets

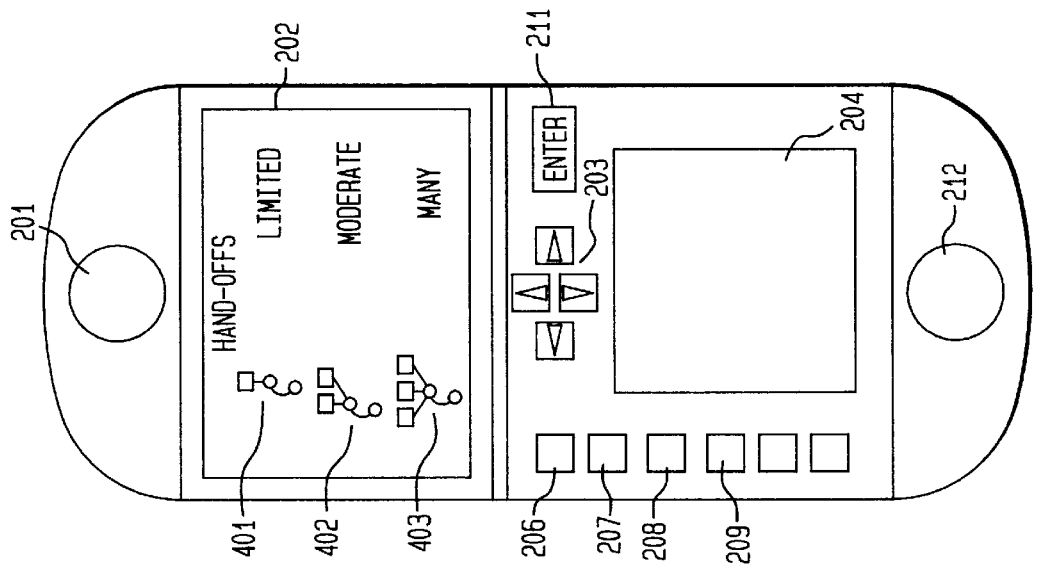
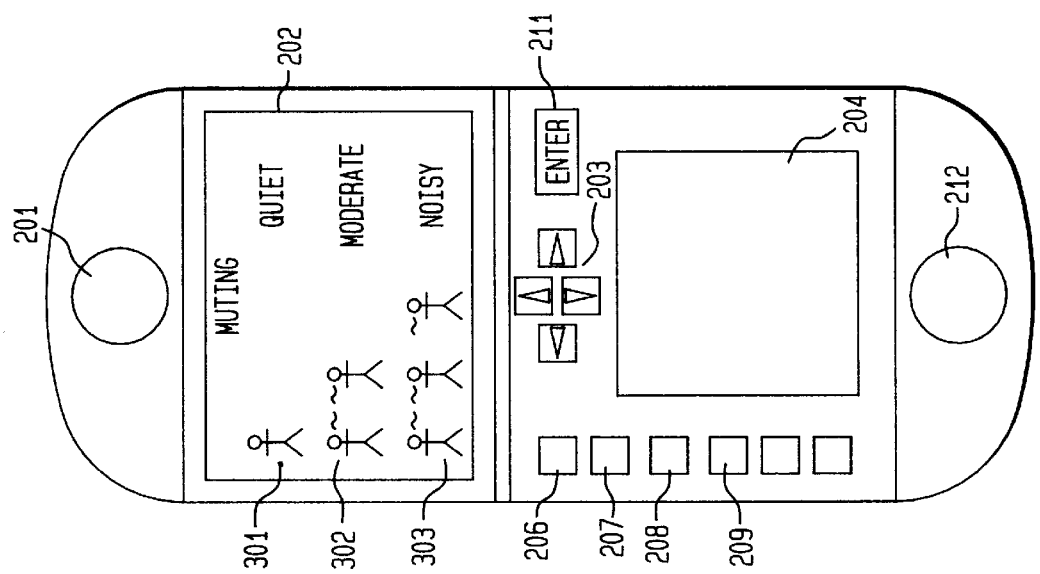

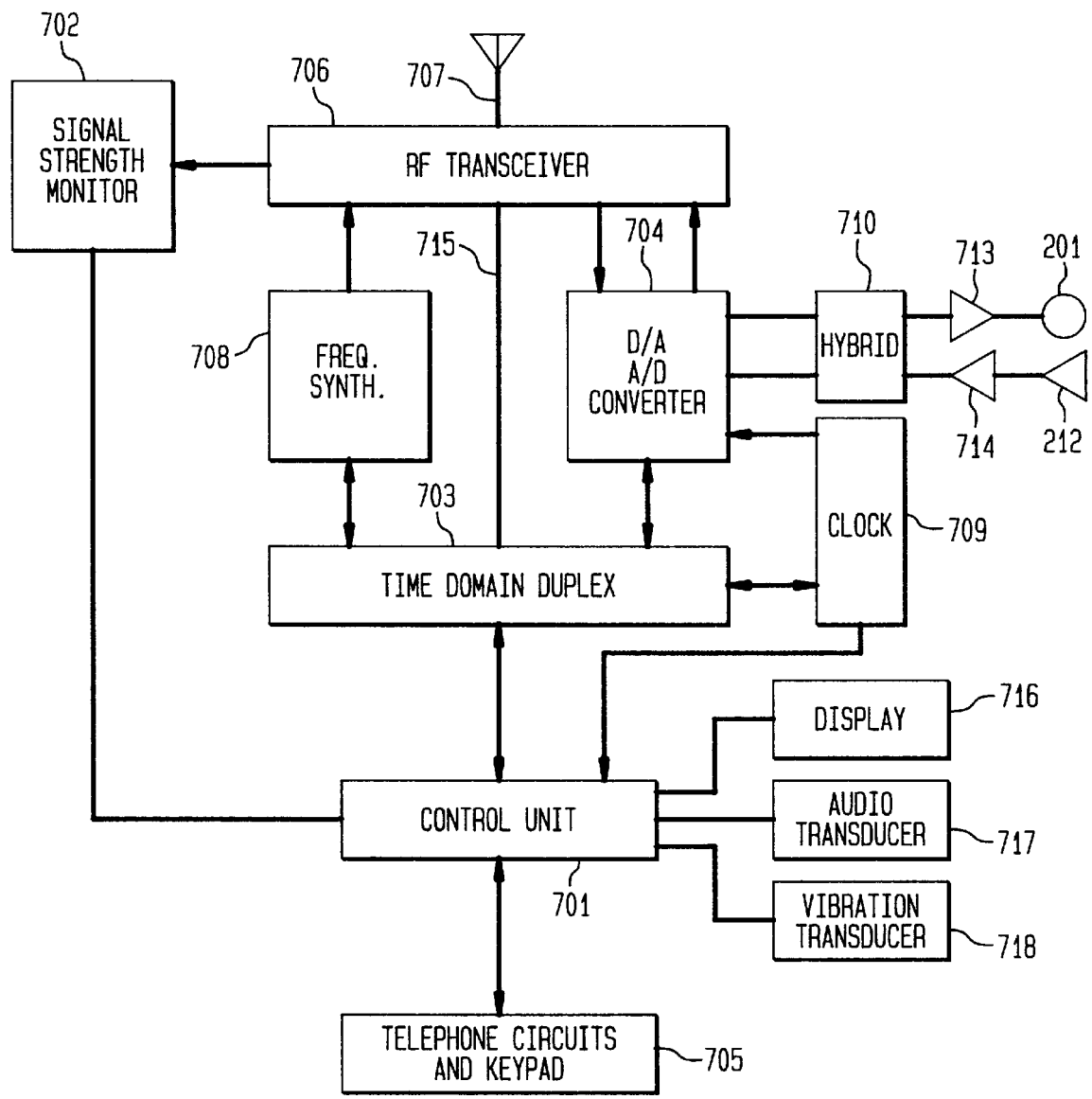

WIRELESS TERMINAL CONTROLLED MOBILITY OPERATIONAL PARAMETERS

TECHNICAL FIELD

This invention relates to wireless terminals and wireless telecommunication systems, and in particular, to allowing a user of a wireless terminal to control mobility operational parameters.

BACKGROUND OF THE INVENTION

In prior art systems, the mobility operational parameters such as the level of noise at which to mute the audio conversation and the signal strength threshold at which to switch from one base station to another base station has been preprogrammed either into a wireless terminal such as a wireless telephone handset or into the wireless telecommunication system. This technique has worked reasonably well for traditional cellular systems because such cellular systems normally perform seamless handoffs and have a small number of base stations with each base station covering a large geographical area. However, in personal communication service (PCS) systems, the technique of preprogramming the mobility operation parameters into the wireless terminal has not been successful for the following reasons. First, PCS systems have a large number of base stations, often in the hundreds, with each base station having limited power, covering only a small geographical area. The result is that as a wireless terminal moves, the wireless terminal is constantly registering on different base stations if the hand-off signal threshold level becomes too high. Similarly, the muting due to noise as a wireless terminal moves will often cause a conversation to be frequently interrupted. Each individual user has their own preference of how often they are willing to have their conversation interrupted as muting occurs or a new base station is selected. Some users want overall excellent reception and others are willing to put up with a noise in order to maintain more constant communication. The switching from base station to base station is further complicated by the fact that PCS systems normally do not provide seamless handoffs because of the large number of base stations.

The problem is made more difficult by the fact that the air interface for PCS systems normally is at a higher frequency than that for cellular systems. The result is that the radio signals communicated between wireless terminals and base stations are more easily interfered with by walls or people's bodies. It is well known that certain PCS air interfaces can cause a wireless terminal to switch from one base station to another base station simply because the user of the wireless terminal turns 180°. The problem is that the person's head creates enough interference with the signal from the original base station to cause the wireless terminal to switch to a second base station.

How the mobility operational parameters should be set depends on each particular user, and the activity in which the user happens to be enaged in at a particular point in time. For example, some users may be relatively stationary and want to adjust their mobility operational parameters for this state; however, the user then may become mobile going to lunch or meetings and want to adjust for this increase in mobility. Other users will be constantly moving such as security guards and maintenance personnel. Some wireless terminals may be stationary and only utilize the wireless link to avoid the cost of having to wire a terminal into a telecommunication system. For example, copying machines now routinely have provisions for a telecommunication connection to a centralized maintenance facility. For a copying machine, it may well be desirable to lock the copying machine's communication to one particular base station to assure high quality data transmission.

In view of the foregoing, there exists a need in the art for users to have the capability of periodically adjusting their mobility operational parameters to fit the activities of the user. Clearly, for the vast majority of the users, this capability must be non-technical in nature. However, some users may want to have full control over the mobility operational parameters and be able to specify these parameters in precise numerical values.

SUMMARY OF THE INVENTION

The foregoing problems are solved and a technical advance is achieved by an apparatus and method in which a user of a wireless terminal can control the mobility operational parameters when desired by the user. Advantageously, the user enters parameter selection information into the wireless terminal; and the wireless terminal converts this parameter selection information into operational parameters and activates these operational parameters. The operational parameters can include a noise threshold level for determining when to mute audio information being communicated between the wireless terminal and a base station. Another operational parameter is the hand-off signal threshold level below which the wireless terminal seeks a new base station upon which to register. The parameter selection information can be in the form of icons which the user selects, or the user may enter precise numerical data. The user of the wireless terminal is given the capability of specifying the base station to which the wireless terminal will register. In addition, for testing purposes the wireless terminal can be programmed to display the signal strength of the base station on which the wireless terminal is registered.

Other and further aspects of the present invention will become apparent during the course of the following description and by reference to the accompanying drawing.

BRIEF DESCRIPTION OF THE DRAWING

FIGS. 2 through 6 illustrate displays for various operations of a wireless terminal;

FIG. 7 illustrates, in block diagram form, greater detail of the internal circuitry of a wireless terminal;

DETAILED DESCRIPTION

Figure 1:
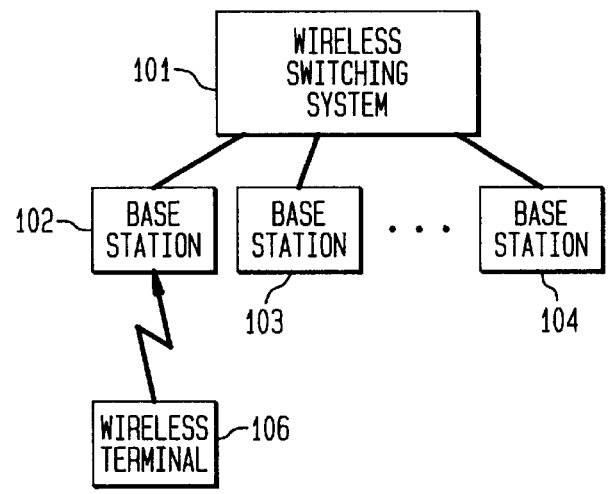
FIG. 1 illustrates a system for implementing the invention.

FIG. 1 illustrates a wireless telecommunication system designed to provide PCS-type service for a plurality of wireless terminals such as wireless terminal 106. Base stations 102–104 are capable of maintaining radio links with the wireless terminals, and each base station is interconnected to wireless switching system 101 via a plurality of links. Advantageously, these links may be basic rate interface (BRI) links as defined for integrated services digital network (ISDN) communication. Wireless terminal 106 communicates with the base stations utilizing digital transmission in the form of packets as disclosed in U.S. Pat. No. 5,396,541 which is hereby incorporated by reference. When registered on base station 102, wireless terminal 106 monitors the contents of packets being received from base station 102 to determine if these packets are being corrupted because of noise. If a sufficient number of packets have been corrupted so that the audio information contained in these packets is not usable, wireless terminal 106 will not play the audio information to the user. This technique is called muting and is well known in the art. In addition, wireless terminal 106 monitors the strength of the signal being received from base station 102. If the signal strength drops below a threshold, wireless terminal 106 attempts to find another base station whose signal strength is higher than base station 102. In a second embodiment which will be described later, the base station performs the threshold measurement and determines when the wireless terminal should be handed off to another base station based on threshold information received from the wireless terminal. In accordance with the invention, the user of wireless terminal 106 can determine the noise threshold level at which muting will occur and determine the hand-off signal threshold level at which wireless terminal 106 will request a hand-off to another base station. Also in accordance with the invention, the user of wireless terminal 106 can specify that the wireless terminal only attempt to register on a subset of base stations 102–104. The ability to determine the noise threshold level for muting, the hand-off signal threshold level for handoffs, and fixing base stations on which to be registered is possible because the user of wireless terminal 106 is able to control the mobility operational parameters that determine these functions.

Figure 2:
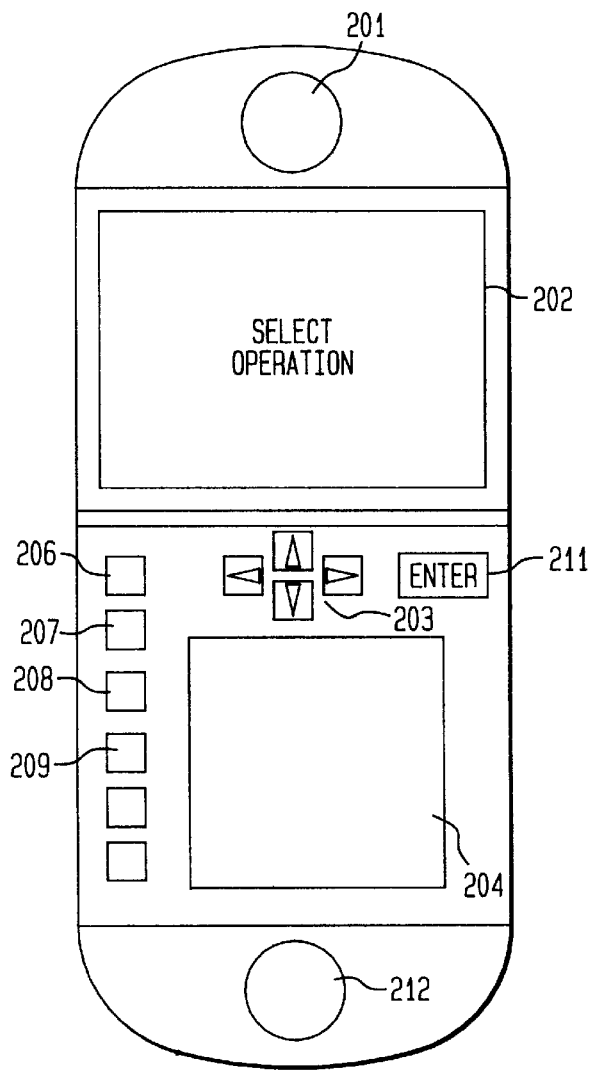

FIG. 2 illustrates the physical configuration of wireless terminal 106. Receiver 201 and transmitter 212 are utilized by the user to conduct a telephone conversation. Keypad 204 is used to dial telephone numbers and to enter numerical data into wireless terminal 106. Display 202 is used to display information to the user and for the user to indicate functions or data to be used by wireless terminal 106. The user indicates the function or data by selecting icons on display 202 by moving a cursor using cursor control 203 to the desired icon and then activating enter button 211. The major functions of wireless terminal 106 are selected by function buttons such as muting button 206. Only those major functions pertaining to the invention are illustrated in FIG. 2; however, one skilled in the art could readily see that such functions as initiating a telephone call would also be performed by a function button such as muting button 206. In addition, one skilled in the art could readily see that the user could also select using cursor control 203 the major function to be performed by positioning the cursor over various icons representing major functions on display 202.

Consider now how the user of wireless terminal 106 defines the mobility operational parameters. First, consider how the user defines to wireless terminal 106 what the noise threshold level should be for muting. The user activates muting button 206 as illustrated in FIG. 2. Wireless terminal 106 is responsive to the actuation of muting button 206 to display the muting information on display 202 as illustrated in FIG. 3. The user then uses cursor control 203 to highlight icon 301–303 with the cursor. Each of these icons has associated with it a predefined noise threshold level above which muting will occur. Icon 301 allows for the least amount of noise before muting takes place; whereas, icon 303 allows for the greatest amount of noise before muting takes place. Once the user has utilized cursor control 203 to highlight the appropriate icon, the user activates enter button 211. Wireless terminal 106 is responsive to the activation of enter button 211 to set the noise threshold level to the value that has been predetermined for the selected icon. After actuation of enter button 211, wireless terminal 106 returns to the display illustrated in FIG. 2.

Figure 6:
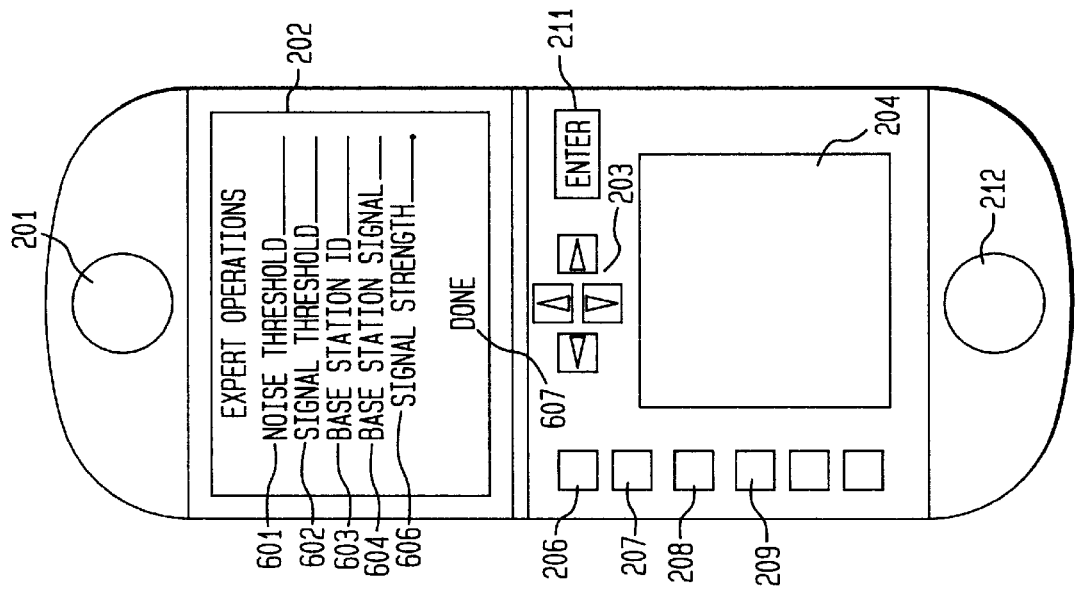

If to adjust the muting, the user has activated expert mode button 209, wireless terminal 106 displays to the user on display 202 the information illustrated in FIG. 6. The user then utilizes cursor control 203 and enter button 211 to select location 601. Keypad 204 is then used to enter the precise noise threshold level numerical value. This numerical value is in the present case the number of packets corrupted per second. After entering this numerical value using keypad 204, the user activates enter button 211 causing the numerical value to be stored and the display illustrated in FIG. 2 to be redisplayed to the user.

Consider now how the user specifies to wireless terminal 106 the hand-off signal threshold level below which wireless terminal 106 will attempt to find another base station so as to initiate the hand-off operation. When the information illustrated in FIG. 2 is being displayed on display 202, the user activates hand-off button 207 as illustrated in FIG. 2. Wireless terminal 106 then displays the information on display 202 illustrated in FIG. 4. Once again, the user utilizes cursor control 203 and enter button 211 to select icon 401–403. Each of these icons causes a predefined hand-off signal threshold level value to be stored by wireless terminal 106 upon enter button 211 being activated.

In addition, if the user actuates expert mode button 209 to adjust the hand-off signal threshold level while the information illustrated in FIG. 2 is being displayed, wireless terminal 106 displays the information on display 202 illustrated in FIG. 6. The user then utilizes cursor control 203 and enter button 211 to select location 602. The user then enters in the blank portion of this location the numerical value of the hand-off signal threshold using keypad 204. After entering the numerical value, the user activates enter button 211. In response to the activation of enter button 211, wireless terminal 106 stores the numerical value as the hand-off signal threshold level and returns the user to the display illustrated in FIG. 2.

Figure 5:
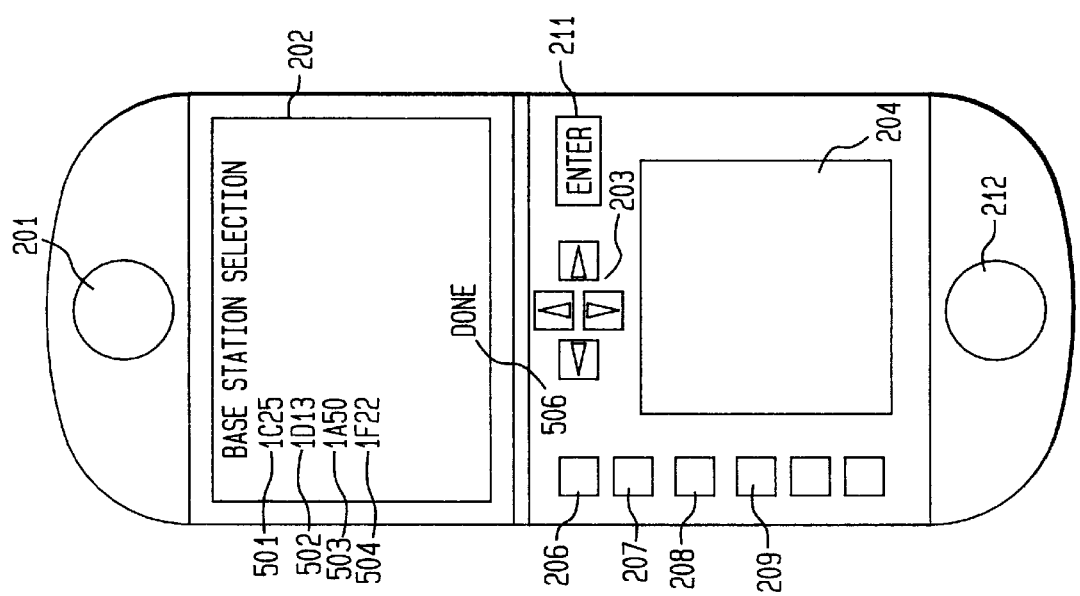
Figure 8:
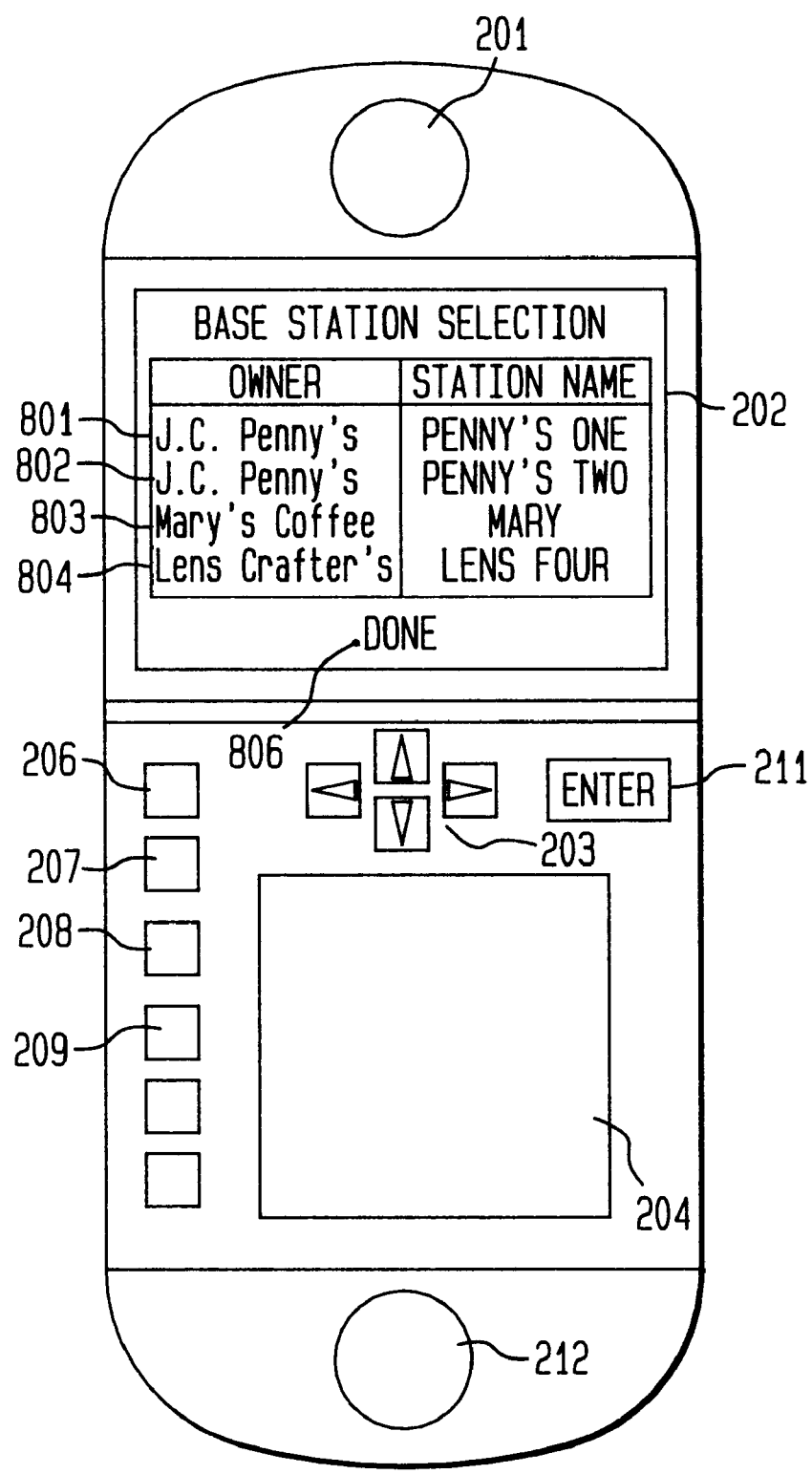
FIG. 8 illustrates a display for the operation of a wireless terminal that designates base stations.

Consider now how the user can fix on which base stations wireless terminal 106 will attempt to register. If while the information illustrated in FIG. 2 is being displayed, the user activates base station? button 206, wireless terminal 106 displays on display 202 the base identification information. This base station identification information can take a number of forms. In FIG. 5, the base station identification information gives the actual physical location of the base stations with respect to known building location parameters. FIG. 8 illustrates a different type of base station identification information. FIG. 8 assumes that wireless system 101 is providing wireless service within an office building which has a number of tenants. Each tenant controls a group of base stations. FIG. 8 shows the base station identification information in terms of the owner of the base station plus a name of that base station. Advantageously, one skilled in the art could readily envision other forms of the base station identification information. Consider now FIG. 5. The information given in locations 501–504 represents the physical location of base stations having the strongest signal strength currently being received by wireless terminal 106 in descending strength. Wireless terminal 106 is responsive to the activation of button 208 of FIG. 2 to first determine the four base stations having the strongest signal strength and then to request from wireless switching system 101 the physical location of each of these base stations. Advantageously, each base station could also transmit periodically their own physical location. The locations represent the building, aisle, and room numbers closest to the base station within the building complex in which the base station is located. This location information is readily understood by the user, and the user can actually physically determine where the base stations are simply by walking around the area. The user utilizes cursor control 203 to highlight the most preferred base station and then activates enter button 211. The user next utilizes cursor control 203 to select the second base station. After the user has selected as many base stations as desired, the user highlights done 506 and activates enter button 211. Wireless terminal 106 is responsive to this operation to store the entered base stations as the base stations which will be utilized in the order selected. After storing the base station identification, wireless terminal 106 returns the user to the information displayed on display 202 illustrated in FIG. 2.

If the user activates expert mode button 209 to specify base stations, wireless terminal 106 displays to the user the information illustrated in display 202 of FIG. 6. The user then utilizes cursor control 206 and enter button 211 to select location 604. The user then enters the wireless switching system identification information for a base station that the user wished to designate before actuating enter button 211. After the user had entered all of the desired base stations, the user highlights done 607 and activates enter button 211. Wireless terminal 106 is responsive to this operation to store the previously entered to return the user to the information on display illustrated in FIG. 2.

The user can also utilize wireless terminal 106 to determine the signal strength received by wireless terminal 106 of any base station. This capability is used by maintenance personnel when the system is first being installed and also to determine later problems. This capability is accomplished by the user activating expert mode button 209 while the display is that illustrated in FIG. 2. The user then uses cursor control 203 and enter button 211 to select location 604 of FIG. 6. The user then enters the wireless switching system identification information of the desired base station using keypad 204 and activates enter button 211. Wireless terminal 106 then measures the signal strength of the designated base station and displays this in the underlined portion of location 606 in highlighted form. The user can repeat the operation for the same base station simply by reactivating enter button 211. To select a new base station, the user re-highlights location 604 and activates enter button 211. When the user has measured the signal strength of all of the desired base stations, the user selects done 607 and is returned to the display illustrated in FIG. 2.

FIG. 7 illustrates, in block diagram form, the internal circuitry of wireless terminal 106. Control unit 701 provides overall control of wireless terminal 106. The radio functions are performed by elements 702, 703, 708, 709, and 706. The operation of these elements is described in greater detail in the previously incorporated U.S. patent. The telephone audio functions are performed by elements 201, 710, 713, 714, and 212. Display 202 and support circuitry are represented by display 716 on FIG. 7. Element 705 represents elements 203–211 of FIG. 2 with support circuitry. Control unit 701 utilizes signal strength monitor 702 to perform the functions that have been described with respect to determining the signal strength of a base station. Time domain duplexer 703 determines when an error has occurred in a packet being received from a base station and reports this information to control unit 701. Based on this error information, control unit 701 utilizes the internal noise threshold level information to determine when to stop the transmission of audio information to receiver 201. Control unit 701 does this by controlling converter 704 via time domain duplexer 703.

Figure 9:
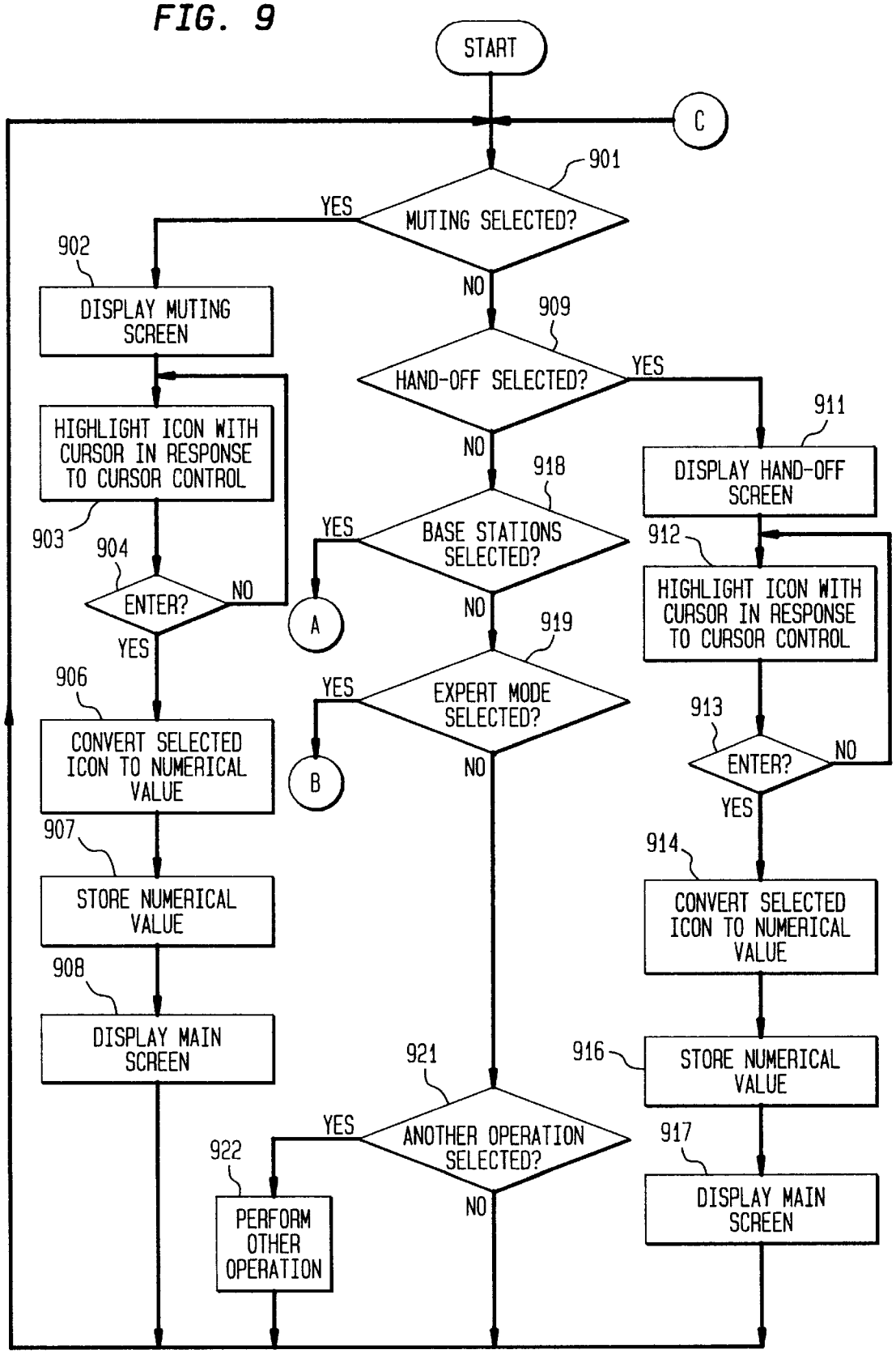
FIGS. 9–15 illustrate, in flow chart form, operations performed by a wireless terminal.

FIG. 9 illustrates the operations performed by control unit 701 of FIG. 7 of wireless terminal 124 while the terminal is in the state illustrated in FIG. 2. Decision block 901 determines if muting button 206 has been activated. If the answer is yes, block 902 displays the muting screen as illustrated in FIG. 3. Block 903 is responsive to actuation of cursor control 203 to move the cursor among icons 301–303. As the cursor is positioned onto an icon, that icon is highlighted. Decision block 904 determines when enter button 211 has been actuated which indicates that the user has selected an icon. Once decision block 904 detects the activation of enter button 211, control is transferred to block 906 which accesses the stored numerical value associated with the selected icon. Block 907 then stores the numerical value as the noise threshold parameter. After execution of block 907, block 908 displays the main screen as illustrated in FIG. 2 and returns control to decision block 901.

Returning to decision block 901, if the answer is no, decision block 909 determines if hand-off button 207 has been activated. If the answer is yes, control is transferred to block 911. Blocks 911–917 perform a similar operation to that previously described for block 902–908. The exception being that the highlighted icon designates a predefined numerical value for the hand-off signal threshold parameter.

Figure 10:
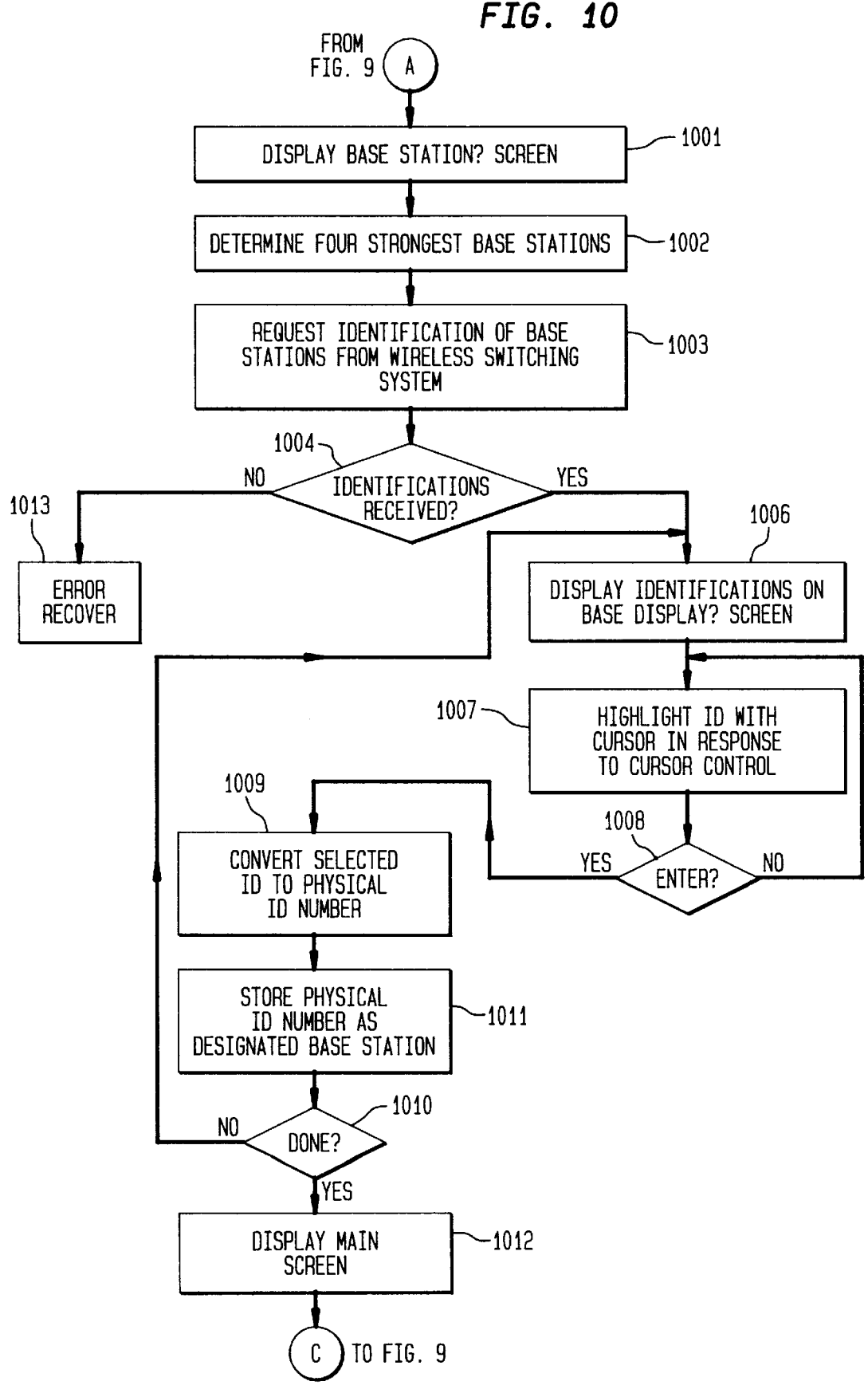

Returning to decision block 909, if the answer is no, control is transferred to decision block 918 which determines if base station? button 208 has been activated. If the answer is yes, control is transferred to connector A of FIG. 10. Block 1001 displays the base station? screen as illustrated in FIG. 5. Block 1002 then determines the four strongest base stations by utilizing signal strength monitor 702 of FIG. 7. Block 1003 then requests the identification of the four base stations from wireless switching system 101. Decision block 1004 determines if the identifications are received back within the predefined amount of time. If the answer is no, error recovery is performed by block 1013. If the answer in decision block 1004 is yes, block 1006 displays the identifications on display 202 of FIG. 5. Block 1007 positions the cursor over the identification in response to cursor control 203. When the user has selected the desired base station identification, the user activates enter button 211 that is detected by decision block 1008 which transfers control to block 1009. The latter block converts the selected identification into the physical identification number of the base station. Block 1011 then stores this physical identification number. Decision block 1010 determines if done location 506 has been selected. If the answer is no, control is returned back to block 1006 and the user is allowed to specify another base station. If the answer is yes in decision block 1010, block 1012 is executed. Block 1012 displays the main screen illustrated in FIG. 2 and returns control to decision block 901 of FIG. 9.

Returning to decision block 918 of FIG. 9, if the answer is no, decision block 919 determines if expert mode button 209 was actuated. If the answer is yes, control is transferred to block 1101 of FIG. 11. The latter block displays the screen illustrated in FIG. 6. Block 1102 then is responsive to cursor control 203 to allow the user to position the cursor (highlight) locations 601, 602, 603 or 604. Decision block 1103 determines when the user has selected one of these locations by the actuation of enter button 211. Upon the actuation of enter button 211, decision block 1104 determines if the user had selected location 601 indicating a desire to change the noise threshold parameter. If the answer is yes, control is transferred to block 1202 of FIG. 12. The latter block receives the numerical value from the user by the user utilizing keypad 204 and enter button 211. After the actuation of enter button 211, decision block 1202 determines if the numerical value is within the minimum and maximum noise threshold limits. If the answer is no, block 1206 indicates an error on display 202 and then returns the user to block 1201. If the answer is yes in decision block 1202, block 1203 stores the numerical value as the noise threshold parameter. Block 1204 displays the mains screen as illustrated in FIG. 2 and returns control to decision block 901 of FIG. 9.

Figure 12:
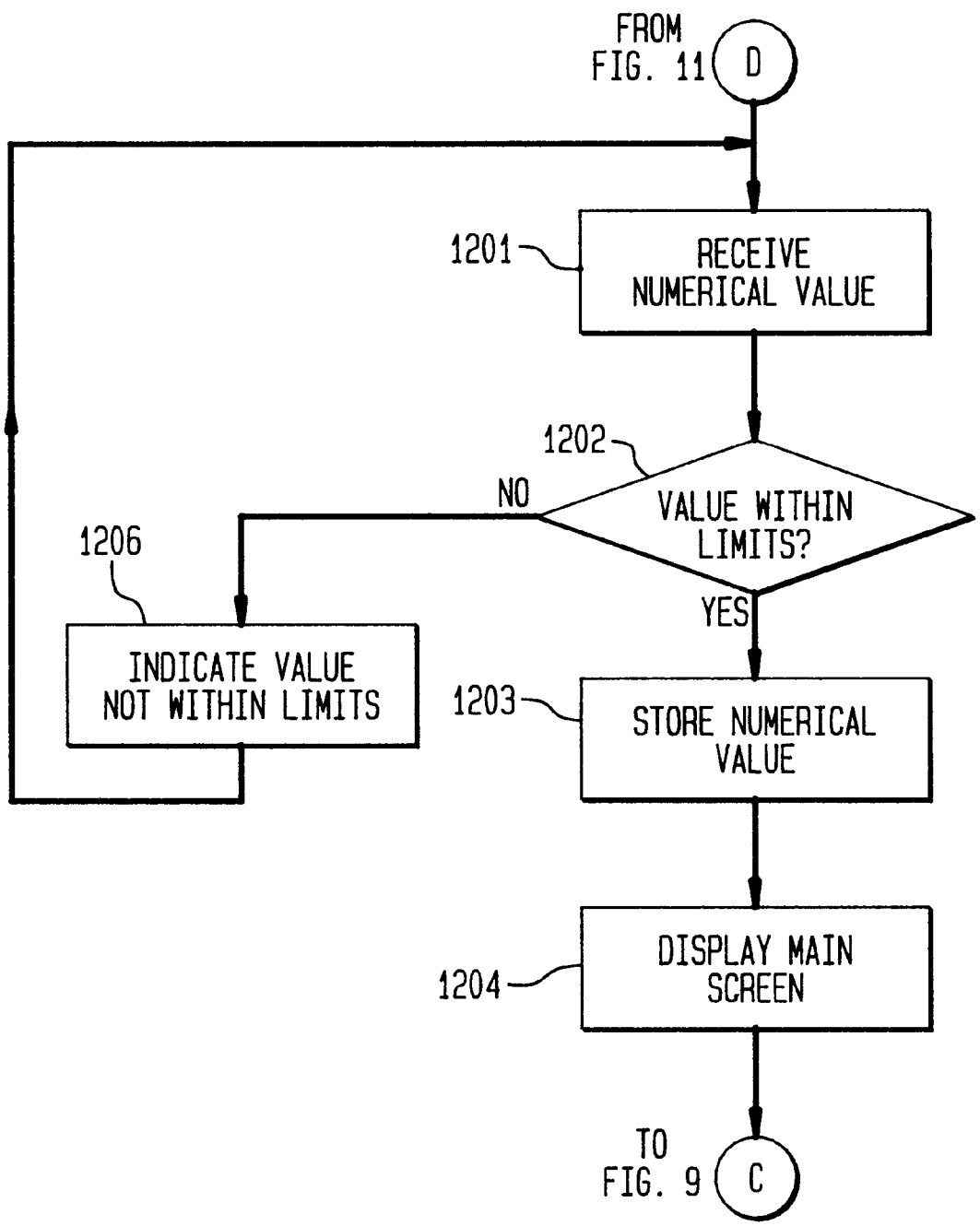
Figure 13:
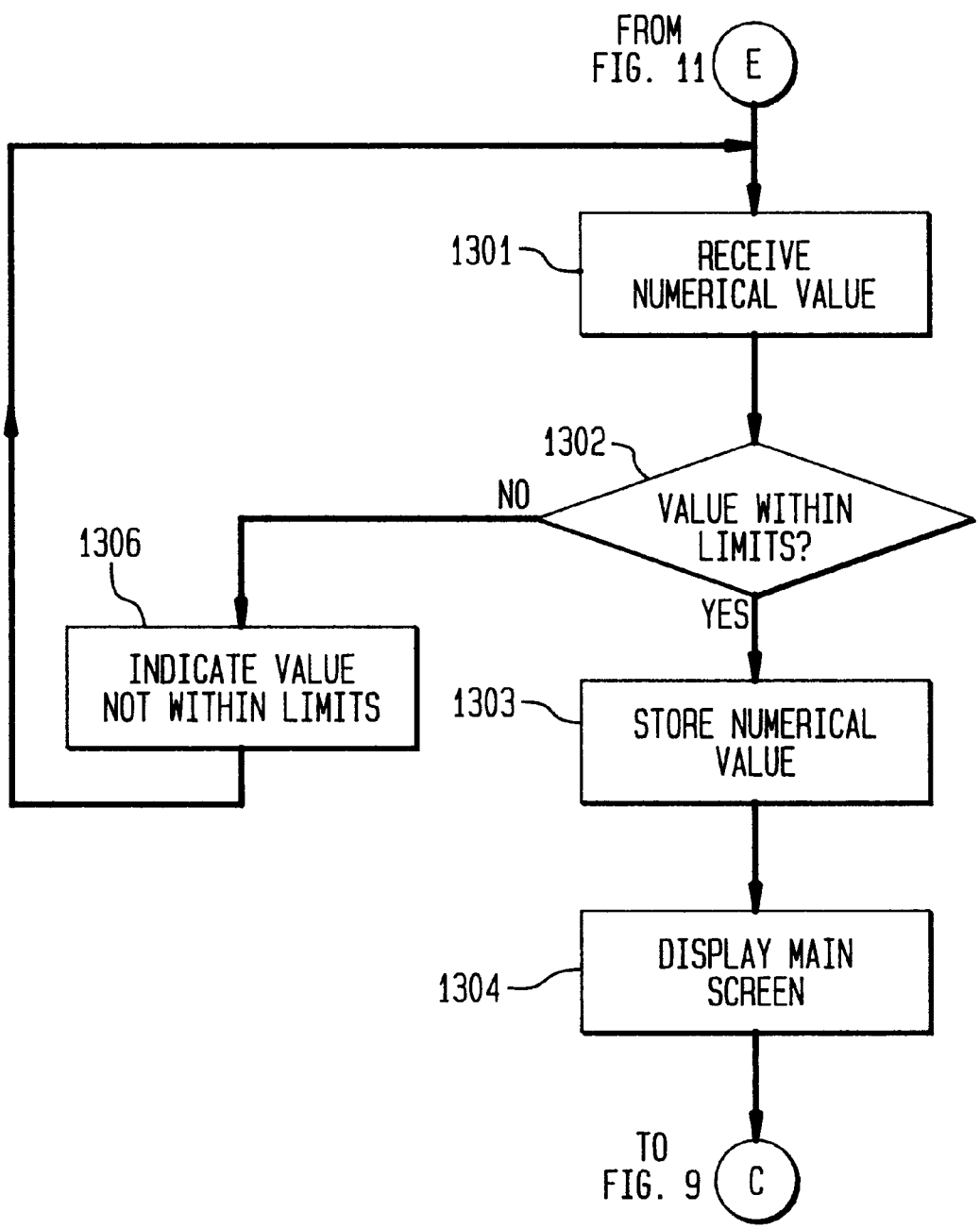

Returning to decision block 1104 of FIG. 4, if the answer is no, control is transferred to decision block 1106 which determines if location 602 of FIG. 6 was selected by the user. If the answer is yes, control is transferred to block 1301 of FIG. 13. Blocks 1301–1304 perform a similar operation to those performed by blocks 1201–1206 of FIG. 12.

Figure 11:
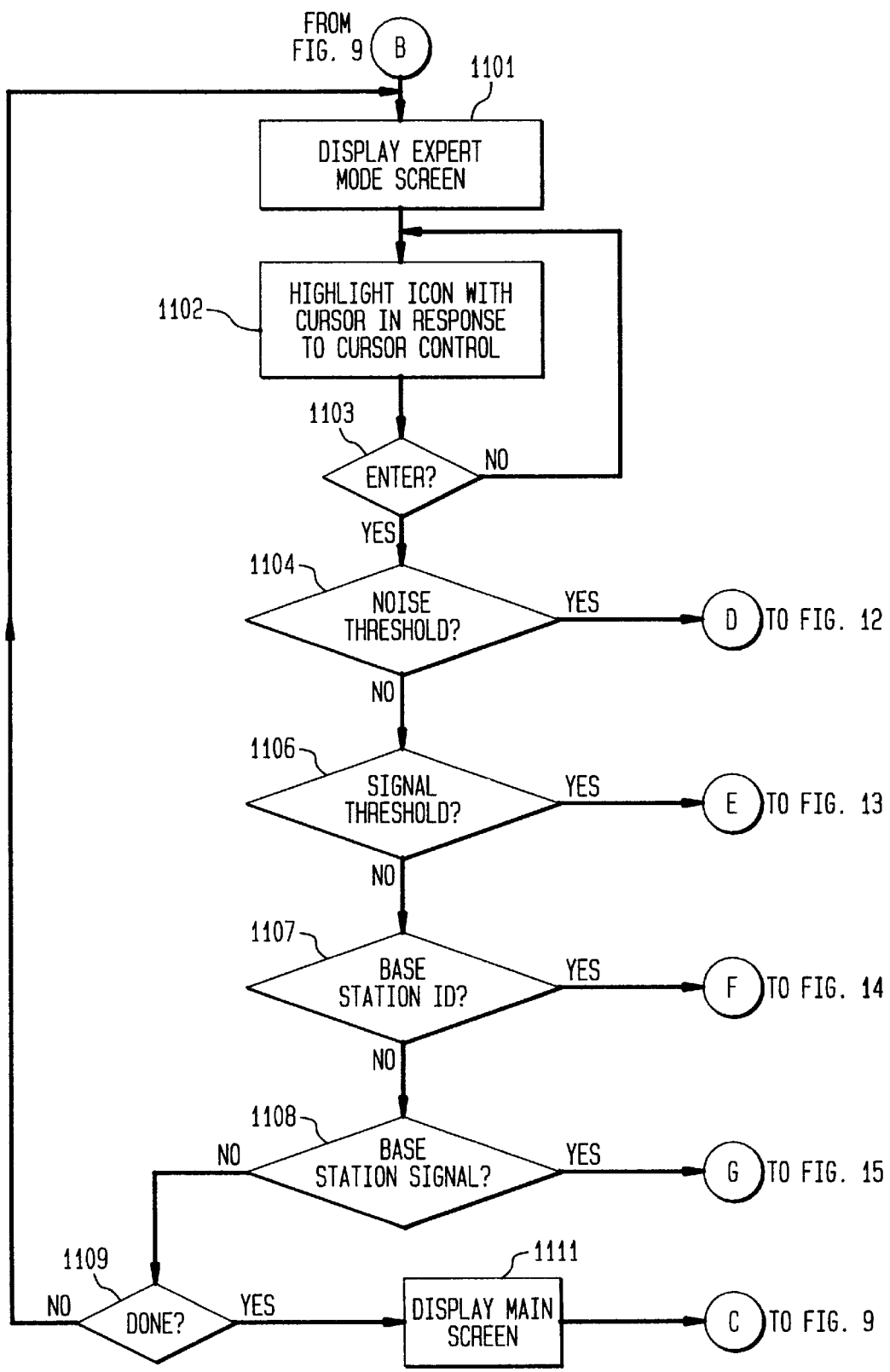
Figure 14:
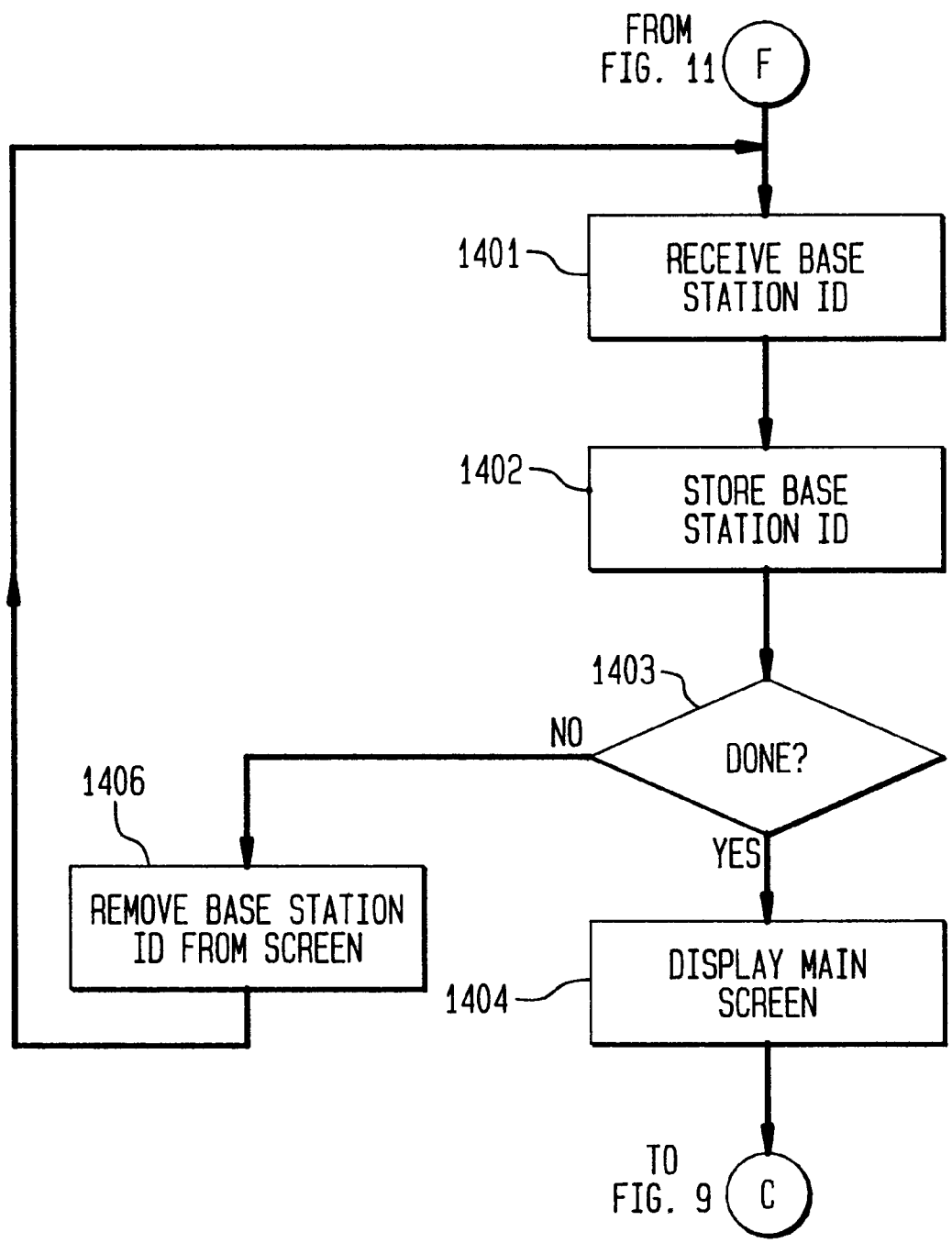

Returning to decision block 1106 of FIG. 11, if the answer is no, decision block 1107 determines if the user had selected location 603. If the answer is yes, control is transferred to block 1401 of FIG. 14. The latter block receives the physical base station identification number that the user enters using keypad 204 and enter button 211. Block 1402 then stores this information. Decision block 1403 determines if the user has selected done location 607. If the answer is no, block 1406 removes the base station ID from the screen displayed in FIG. 6, and transfers control back to block 1401. The user is now allowed to enter another base station. If the answer is yes in decision block 1403, block 1404 displays the main screen as illustrated in FIG. 2 before returning control to decision block 901 of FIG. 9.

Figure 15:
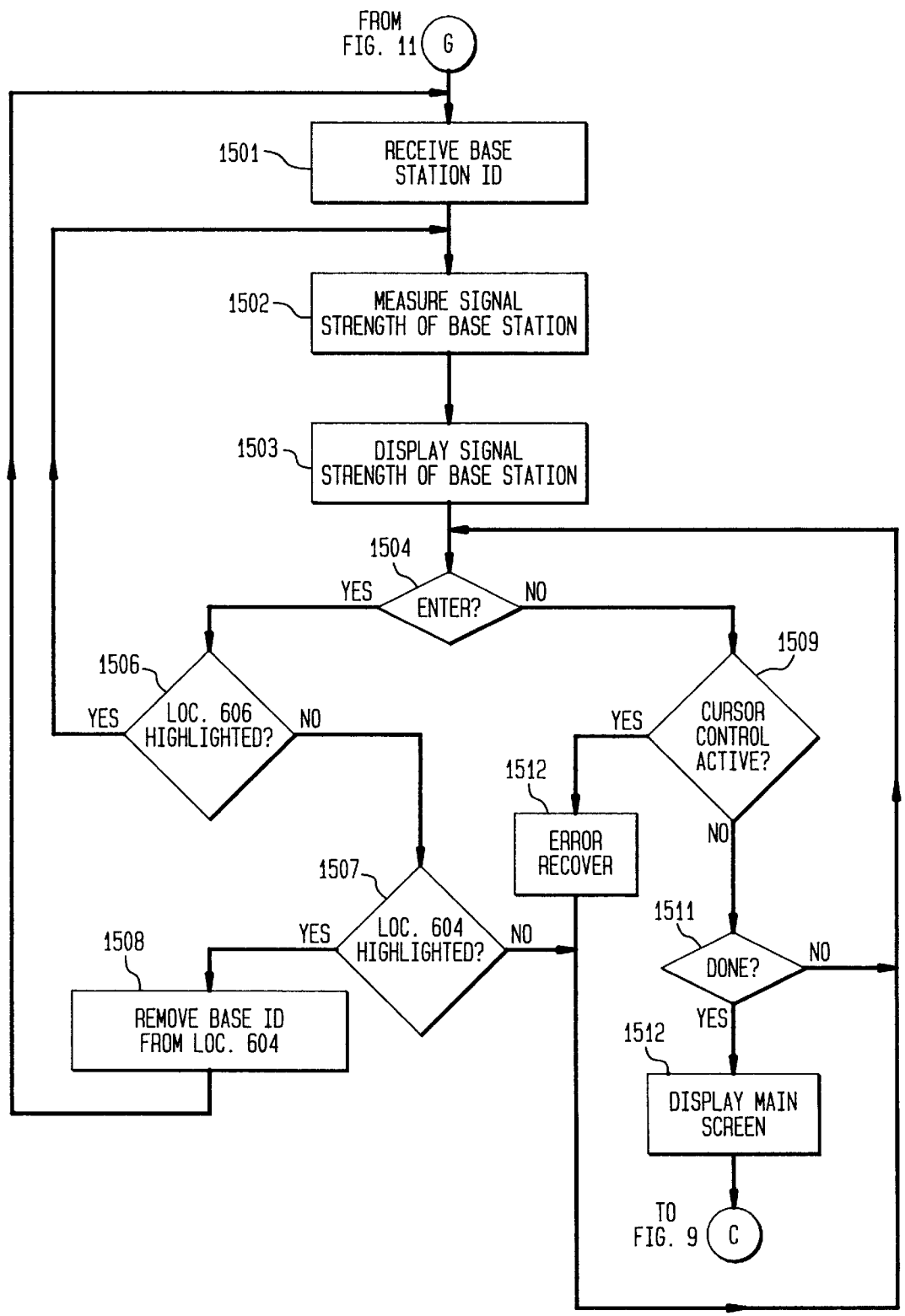

Returning to decision block 1107 of FIG. 11, if the answer is no, decision block 1108 determines if location 604 has been selected by the user indicating that the user wishes to measure the signal strength of a particular base station. If the answer is yes, control is transferred to block 1501 of FIG. 15. The latter block allows the user to enter the physical base station identification number of the desired base station which is displayed in the underlined portion of location 604 of FIG. 6. Block 1502 then measures the signal strength of the selected base station, and block 1503 displays this information in the underlined portion of location 606. Decision block 1504 then determines if enter button 211 has been actuated. If the answer is yes, decision block 1506 determines if location 606 of FIG. 6 is highlighted. If location 606 is highlighted and the user has actuated enter button 211, this means that the user wishes to remeasure the signal strength of the previously selected base station whose identification number is still displayed in the underlined portion of location 604. If the answer is yes in decision block 1506, control is transferred back to block 1502. If the answer in decision block 1506 is no, decision block 1507 determines if location 604 is highlighted. The highlighting of location 604 indicates that the user wishes to measure the signal strength of another base station. If the answer is yes in decision block 1507, block 1508 removes the base station identification number from the underlined portion of location 604 and returns control to block 1501. If the answer in decision block 1507 is no, control is transferred back to decision block 1504.

Returning to decision block 1504, if the answer is no, control is transferred to decision block 1509 which determines if cursor control 203 is being activated by the user. If the answer is yes, block 1512 positions the cursor as indicated by the user before transferring control back to decision block 1504. If the decision in decision block 1509 is no, decision block 1511 determines if done location 607 has been selected by the user. If the answer is yes, block 1512 displays the mains screen as illustrated in FIG. 2 and transfers control back to decision block 901 of FIG. 9. If the decision in decision block 1511 is no, control is transferred back to decision block 1504.

Returning to decision block 1108 of FIG. 11, if the answer is no, control is transferred to block 1109 which determines if done location 607 of FIG. 6 has been selected, if the answer is no, control is transferred to block 1101 of FIG. 11. If the answer in decision block 1109 is yes, block 1111 displays the mains screen as illustrated in FIG. 2 and returns control to decision block 901 of FIG. 9.

The invention claimed is:

1. A method for controlling mobility operational parameters by a wireless terminal where the wireless terminal interconnects to a wireless telecommunication system via a plurality of base stations, comprising the steps of:

receiving parameter selection information from a user via the wireless terminal;

storing the parameter selection information in the wireless terminal; and activating operational parameters specified by parameter selection information wherein the activated operational parameters specify operations of the wireless terminal during a telephone conversation with one of the operational parameters controlling a noise threshold level above which the wireless terminal will mute audio information from one of the plurality of base station on which the wireless terminal is registered.

2. A method for controlling mobility operational parameters by a wireless terminal where the wireless terminal interconnects to a wireless telecommunication system via a plurality of base stations, comprising the steps of:

receiving parameter selection information from a user via the wireless terminal;

storing the parameter selection information in the wireless terminal; and activating operational parameters specified by parameter selection information wherein the activated operational parameters specify operations of the wireless terminal during a telephone conversation with one of the operational parameters controlling a hand-off signal threshold level below which the wireless terminal seeks a new one of the plurality of base stations on which to register.

3. The method of claim 1 or 2 wherein the step of receiving comprises receiving numerical data specifying the parameter selection information.

4. The method of claim 1 or 2 further comprises the step of transmitting the stored operational parameters to the wireless telecommunication system by the wireless terminal; and storing the transmitted operational parameters by the wireless telecommunication system.

5. The method of claim 4 further comprises the step of transmitting the stored operational parameters to the wireless terminal by the wireless telecommunication system upon the wireless terminal next re-registering on the wireless telecommunication system.

6. The method of claim 5 further comprises the step of reactivating the transmitted stored operational parameters from the wireless telecommunication system by the wireless terminal.

7. The method of claim 1 or 2 wherein the step of receiving comprises the steps of displaying a plurality of icons;

selecting one of the plurality of icons by the user; and determining the parameter selection information from the selected one of the plurality of icons.

8. A method for controlling mobility operational parameters by a wireless terminal where the wireless terminal interconnects to a wireless telecommunication system via a plurality of base stations, comprising the steps of:

receiving parameter selection information from a user via the wireless terminal;

storing the parameter selection information in the wireless terminal;

activating operational parameters specified by parameter selection information wherein the activated operational parameters specify operations of the wireless terminal during a telephone conversation;

selecting one of the plurality of base stations; and displaying a signal strength being received from the selected one of the plurality of base stations.

9. A method for controlling mobility operational parameters by a wireless terminal where the wireless terminal interconnects to a wireless telecommunication system via a plurality of base stations, comprising the steps of:

receiving parameter selection information from a user via the wireless terminal;

storing the parameter selection information in the wireless terminal; and activating operational parameters specified by parameter selection information wherein the activated operational parameters specify operations of the wireless terminal during a telephone conversation with one of the operational parameters specifying a subset of the plurality of base stations on which the wireless terminal will register.

10. The method of claim 5 further comprises the step of determining a signal strength for each the subset of the plurality of base stations;

displaying the subset of the plurality of base stations and the signal strength for each the subset of the plurality of base stations on the wireless terminal;

allowing selection of ones of the plurality of base stations; and establishing the one of the operational parameters from the selected ones of the plurality of base stations.

11. An apparatus for controlling mobility operational parameters by a wireless terminal where the wireless terminal interconnects to a wireless telecommunication system via a plurality of base stations, comprising:

means for receiving parameter selection information from a user via the wireless terminal;

means for storing the parameter selection information in the wireless terminal; and means for activating operational parameters specified by parameter selection information wherein the activated operational parameters specify operations of the wireless terminal during a telephone conversation with one of the operational parameters controlling a noise threshold level above which the wireless terminal will mute audio information from one of the plurality of base station on which the wireless terminal is registered.

12. An apparatus for controlling mobility operational parameters by a wireless terminal where the wireless terminal interconnects to a wireless telecommunication system via a plurality of base stations, comprising:

means for receiving parameter selection information from a user via the wireless terminal;

means for storing the parameter selection information in the wireless terminal; and means for activating operational parameters specified by parameter selection information wherein the activated operational parameters specify operations of the wireless terminal during a telephone conversation with one of the operational parameters controlling a hand-off signal threshold level below which the wireless terminal seeks a new one of the plurality of base stations on which to register.

13. The apparatus of claim 11 or 12 wherein the means for receiving comprises receiving numerical data specifying the parameter selection information.

14. The apparatus of claim 11 or 12 further comprises means for transmitting the stored operational parameters to the wireless telecommunication system by the wireless terminal; and means for storing the transmitted operational parameters by the wireless telecommunication system.

15. The apparatus of claim 14 further comprises means for transmitting the stored operational parameters to the wireless terminal by the wireless telecommunication system upon the wireless terminal next re-registering on the wireless telecommunication system.

16. The apparatus of claim 15 further comprises means for reactivating the transmitted stored operational parameters from the wireless telecommunication system by the wireless terminal.

17. The apparatus of claim 11 or 12 wherein the means for receiving comprises means for displaying a plurality of icons;

means for selecting one of the plurality of icons by the user; and means for determining the parameter selection information from the selected one of the plurality of icons.

18. An apparatus for controlling mobility operational parameters by a wireless terminal where the wireless terminal interconnects to a wireless telecommunication system via a plurality of base stations, comprising:

means for receiving parameter selection information from a user via the wireless terminal;

means for storing the parameter selection information in the wireless terminal;

means for activating operational parameters specified by parameter selection information wherein the activated operational parameters specify operations of the wireless terminal during a telephone conversation;

means for selecting one of the plurality of base stations; and means for displaying a signal strength being received from the selected one of the plurality of base stations.

19. An apparatus for controlling mobility operational parameters by a wireless terminal where the wireless terminal interconnects to a wireless telecommunication system via a plurality of base stations, comprising:

means for receiving parameter selection information from a user via the wireless terminal;

means for storing the parameter selection information in the wireless terminal; and means for activating operational parameters specified by parameter selection information wherein the activated operational parameters specify operations of the wireless terminal during a telephone conversation with one of the operational parameters specifying a subset of the plurality of base stations on which the wireless terminal will register.

20. The apparatus of claim 19 further comprises means for determining a signal strength for each the subset of the plurality of base stations;

means for displaying the subset of the plurality of base stations and the signal strength for each the subset of the plurality of base stations on the wireless terminal;

means for allowing selection of ones of the plurality of base stations; and means for establishing the one of the operational parameters from the selected ones of the plurality of base stations.

* * * * *